United States Patent [19]

McFarland et al.

[11] Patent Number: 4,786,550

[45] Date of Patent: Nov. 22, 1988

[54] MELTBLOWN AND COFORM MATERIALS HAVING APPLICATION AS SEED BEDS

[75] Inventors: Timothy M. McFarland, Neenah; James J. O'Connor, Appleton, both of Wis.

[73] Assignee: Kimberly-Clark Corporation, Neenah, Wis.

[21] Appl. No.: 730,620

[22] Filed: May 6, 1985

[51] Int. Cl.$^4$ .............................................. A01G 9/10
[52] U.S. Cl. ........................................ 428/203; 47/9; 47/56
[58] Field of Search ................. 47/9, 56; 428/283, 297

[56] References Cited

U.S. PATENT DOCUMENTS

| | | |
|---|---|---|
| 2,749,964 | 6/1956 | Manning . |
| 2,830,404 | 4/1958 | Manning . |
| 3,160,986 | 12/1964 | Watson et al. ........................ 47/56 |
| 3,205,619 | 9/1965 | Henry ................................... 47/9 |
| 3,299,567 | 1/1967 | Perkins ................................. 47/9 |
| 3,302,323 | 2/1967 | Popa ..................................... 47/9 |
| 3,315,408 | 4/1967 | Fisher ............................... 47/56 X |
| 3,320,695 | 5/1967 | Moore, Jr. ............................ 47/9 |
| 3,427,194 | 2/1969 | Lippoldt et al. ..................... 47/9 |
| 3,467,142 | 9/1969 | Boyle et al. ...................... 47/56 X |
| 3,511,694 | 5/1970 | Lippoldt et al. .................. 427/420 |
| 3,516,196 | 6/1970 | Lippoldt et al. .................... 47/56 |
| 3,557,491 | 1/1971 | Franklin et al. ..................... 47/56 |
| 3,709,263 | 1/1973 | Jackson et al. . |
| 3,795,654 | 3/1974 | Kirkpatrick . |
| 3,848,359 | 11/1974 | Seith et al. . |
| 3,849,241 | 11/1974 | Butin et al. ...................... 161/169 |
| 3,863,388 | 2/1975 | Loads . |
| 3,886,683 | 6/1975 | Hudgin et al. ....................... 47/9 |
| 3,981,100 | 9/1976 | Weaver et al. .................. 47/59 X |
| 4,007,556 | 2/1977 | Gluck .................................. 47/56 |
| 4,090,325 | 5/1978 | Mushin et al. . |
| 4,100,324 | 7/1978 | Anderson et al. ............. 428/303 X |
| 4,272,919 | 6/1981 | Schmidt ............................ 47/9 X |
| 4,283,880 | 6/1981 | Fjeldsa ................................ 47/56 |
| 4,309,844 | 6/1982 | King et al. ........................... 47/56 |
| 4,342,807 | 8/1982 | Rasen et al. ..................... 47/9 X |
| 4,414,776 | 8/1983 | Ball ..................................... 47/56 |
| 4,429,001 | 1/1984 | Kolpin et al. .................... 428/283 |
| 4,433,024 | 2/1984 | Eian ............................... 428/283 X |
| 4,584,790 | 4/1986 | Gaughen ............................. 47/56 |
| 4,604,313 | 8/1986 | McFarland et al. ............. 428/172 |

FOREIGN PATENT DOCUMENTS

| | | |
|---|---|---|
| 1582527 | 7/1970 | Fed. Rep. of Germany . |
| 2158914 | 7/1972 | Fed. Rep. of Germany . |
| 2152411 | 4/1973 | Fed. Rep. of Germany . |
| 2113731 | 8/1983 | United Kingdom . |

OTHER PUBLICATIONS

European Search Report of Apr. 13, 1987 in EP 86 10 6202, (5 pages).
"Future Markets and Competitive Threats to Nonwovens," Tappi Journal, Oct. 1984, by G. Goldstein, pp. 44-48.

Primary Examiner—Nancy A. B. Swisher
Attorney, Agent, or Firm—Paul A. Leipold; Douglas L. Miller

[57] ABSTRACT

The invention is generally accomplished by providing a seedbed of meltblown material having incorporated therein seeds. It is preferred that in addition to the incorporation of seeds that there is also incorporated absorbent material such as cellulose fibers and superabsorbent materials such as hydrogels.

14 Claims, 6 Drawing Sheets

MELTBLOWN AND COFORM MATERIALS HAVING APPLICATION AS SEED BEDS

TECHNICAL FIELD

This invention is concerned with the provision and utilization of nonwoven fabrics as seedbeds. It is particularly concerned with providing meltblown materials that have incorporated therein seeds and support mediums for growing the needs such as fertilizers and superabsorbents.

BACKGROUND ART

Woven jute and synthetic nettings have been used for the control of erosion for several years. The open nettings are too weak to provide sufficient soil stabilization, are difficult to handle, and have a tendency to tear during laying. The closed nettings are expensive, and, being nondegradable, tend to be lifted by grass growing under the netting, allowing wind to lift the netting from the ground. Eventually the netting must be removed by hand and effective control of erosion ceases.

Existing nettings have been employed or suggested for use in applications such as highway construction and maintenance, landscaping, and strip mine recovery. With the possible exception of certain landscaping applications, all such cases require a system needing little maintenance once the area covered by the netting is planted. It would be highly desirable to have a product which would both degrade enough to allow full development of vegetation and yet provide permanent erosion control.

U.S. Pat. No. 3,315,408 to Fisher is an example of a prior art woven fabric intended for the control of soil erosion. Although the patent suggests the utilization of different types of yarns, including biodegradable yarns and tubular or hollow core yarns containing agents or materials to be released (such as fertilizers, pesticides and weed killers), the woven fibrous material taught by this patent suffers from the deficiencies of woven materials, including limited flexibility and limitations upon the yarns which may be woven. Moreover, the fabrics taught do not possess sufficient versatility to provide a complete agricultural-horticultural system.

Other types of mulches or ground covers employing sheets of material, as contrasted with nettings, are disclosed, for example, in U.S. Pat. No. 3,205,619 to Henry, U.S. Pat. No. 3,302,323 to Popa, U.S. Pat. No. 3,467,142 to Boyle et al., U.S. Pat. No. 3,511,694 to Lippoldt et al., U.S. Pat. No. 3,427,194 to Lippoldt et al., and U.S. Pat. No. 3,516,196 to Lippoldt et al. The Henry, Popa, and Boyle et al. patents teach the utilization of such sheets for irrigation or fluid distribution. It has also been proposed to provide ground cover sheets with seeds, fungicides, fertilizers, insecticides, herbicides, and growth hormones, for example, to facilitate the planting and growth of grass or other plants. See, for example, U.S. Pat. No. 3,557,491 to Franklin et al. and U.S. Pat. No. 3,160,986 to Watson et al. However, it has not been possible heretofore to provide such elements and structures in a satisfactory open-mesh mulch, in particular a mulch having sufficient versatility and other basic characteristics to provide a complete agricultural-horticultural system.

U.S. Pat. No. 3,848,359—Seith et al.—discloses knitted fabric mulches for use in erosion control, landscaping and other agricultural uses. It is disclosed that the fabric may contain a degradable seed tape. This product has the disadvantage that it is complicated to form and further, the seed tape does not easily retain water, must be fastened to the fabric and is easily dislodged.

U.S. Pat. No. 4,429,001—Kolpan and UK Patent Application GB No. 2,113,731—Minto et al.—disclose the use of highly absorbent materials in a meltblown substrate to provide an absorbent layer. It is disclosed in the UK application that the absorbent material may be a clay, sponge or superabsorbent.

U.S. Pat. No. 4,100,324—Anderson et al.—discloses the melt-blown composite of a polymer fiber and cellulose fiber to form a nonwoven fabric.

There remains a need for an agricultural fabric that will be stable during the time of seeding, will degrade within a reasonable time, and further will provide protection and nourishment to the seed during germination and sprouting.

DISCLOSURE OF THE INVENTION

It is an object of this invention to overcome disadvantages of prior art materials, processes and apparatus.

It is another object of this invention to provide an artificial seedbed or mulch that requires less watering than prior seedbeds.

It is an additional object of this invention to provide a low cost process and apparatus for forming an artificial seedbed.

These and other objects of the invention are generally accomplished by providing meltblown material having incorporated therein seeds. It is preferred that in addition to incorporation of seeds that there is also incorporated absorbent materials such as cellulose fibers and superabsorbent materials such as hydrogels. Further, it is preferred that the meltblown polymer be degradable by sunlight and/or action of water in the soil.

In a particularly preferred form of the invention the article is formed by an apparatus and process in which an air-formed structure of polyolefin fiber and cellulose fiber is formed, having incorporated therein seeds and superabsorbent particles during the forming process. This results in an article that has the seeds imbedded in the loose structure of the nonwoven meltblown material where they are free to sprout and will not be easily shaken loose or removed by birds.

MODES FOR CARRYING OUT THE INVENTION

The apparatus, process and article of the invention have numerous advantages over the prior processes, apparatuses and articles. The artificial seedbed formed by the invention provides uniform control of seed dispersal. The seeds will not wash away from the site of the bed as they are embedded in the material. The article of the invention does not need any covering to prevent drying out after seeding. Further, since straw or other material is not necessary, the problem with such materials being unsightly as they are blown around is decreased. A further advantage is that the invention provides protection from birds for the seeds during germination. The material of the invention further will degrade rapidly and its degradation is controllable by the structure of the polymer utilized. The invention reduces the watering frequency of seedbeds and allows the seeding of steep slopes. Further, as compared with the use of sod, the seeding of slopes in shady spots is much improved as sod farm grass does not grow well in shade. The material is light in weight and is much easier to place for seeding than sod. The article of the invention further may contain additives such as pesticides or herbicides to inhibit weed growth and may be colored to give the look of grass even prior to the grass growing. By the use of superabsorbents in combination with grass seed, the season for growing grass may be extended beyond the normal fall and spring planting times. These and other advantages of the invention will become apparent from the detailed description below.

Figure 1:
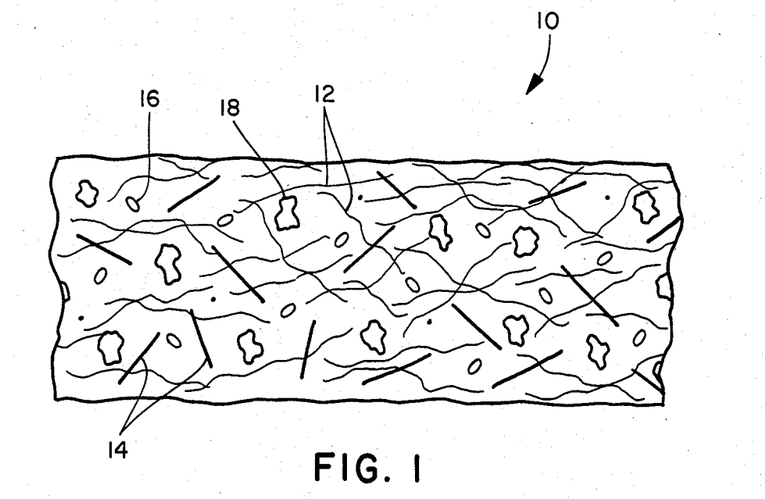
FIG. 1 is a fragmentary cross section of an article of the invention.

FIG. 1 is a fragmentary cross section of an article in accordance with the invention. The article 10 of FIG. 1 is composed of a network of air-formed polymer fibers 12 and wood fibers 14. The article 10 further contains seed 16 and superabsorbent 18. The dry superabsorbent 18 and seed 16 are securely held within the network of fibers 12 and 14. Fibers 12 and 14 are mechanically held together by being mingled during air forming immediately after extrusion. The meltblowing of composites of thermoplastic polymers and wood pulp fibers is known and as disclosed in U.S. Pat. No. 4,100,324—Anderson et al.—hereby incorporated by reference. The air-formed combination of cellulose fibers and meltblown polymer is commonly known as coform. A system for injection of superabsorbents into meltblown composite materials is disclosed in U.S. Ser. No. 602,993 filed Apr. 23, 1984—inventors McFarland, et al., which is coassigned with this invention and is hereby incorporated by reference.

Figure 2:
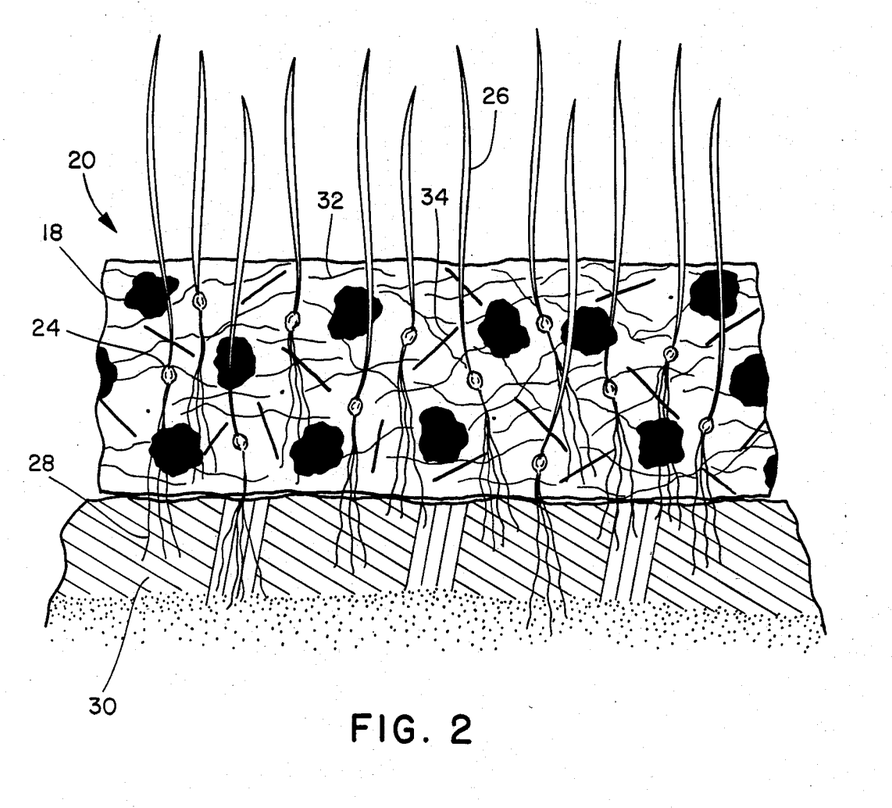
FIG. 2 is a fragmentary cross section of an article of the invention after sprouting.

FIG. 2 illustrates a seedbed 20 in accordance with the invention. The seeds 24 have grown sprouts 26 and roots 28. The roots 28 are penetrating the soil 30. The mingled polymer fibers 32 and wood fibers 34 have not degraded to a significant extent. The superabsorbent 18 has absorbed water and expanded.

Figure 3:
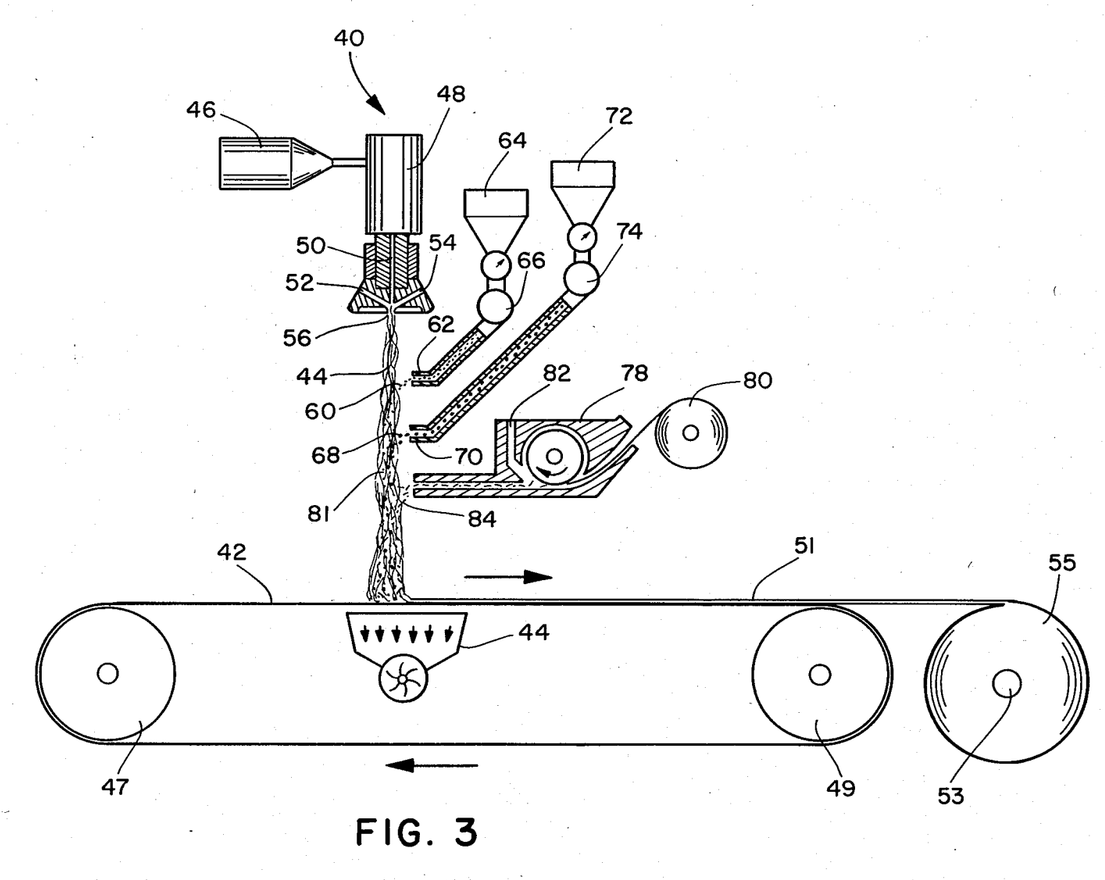
FIG. 3 is a schematic illustration of forming apparatus for the article of the invention.

FIG. 3 illustrates the apparatus and process of the invention that is composed of meltblown extrusion apparatus 40, depositing meltblown fibers 44 onto moving foraminous belt 42. The extrusion apparatus 40 is composed of a source of polymer 46 that is fed to an extrusion device 48. The polymer is extruded in a series of fine streams from the central nozzle 50. These fine streams are subjected to high speed air flow from nozzles 52 and 54 that break up the continuous streams and form the meltblown material. Immediately below the nozzle 56 there is injected into the air stream the seeds 60 from nozzle 62. The seeds are brought from storage device 64 through blower 66. Below the seed device is illustrated the addition of superabsorbent 68 from nozzle 70. Superabsorbent 68 is fed from hopper 72 through blower 74. There is also added immediately below the extrusion nozzle 56 divellicated wood fibers from fiberizer 78. While illustrated with significant distances between nozzles for seed, wood fiber and superabsorbents, the preferred apparatus would have all three nozzles located quite close together immediately below the meltblown extrusion nozzle 56. Pulp is fed from roll 80 into the fiberizer 78 where it is divellicated and combined with air stream from channel 82, and the fibers 84 are blown into the forming stream containing the meltblown 81 superabsorbent 68 and seeds 60. The meltblown containing superabsorbent 68 and seeds 69 is deposited upon foraminous belt 42 drawn there by a vacuum fan device 44. The foraminous belt 42 moved by drive rolls 47 and 49 transports the web 51 to where it is rolled on roller production device 53 for storage. The roll 55 may be later cut to size for whatever use is intended.

The apparatus shown in FIG. 4 may be used to illustrate some of the variations and modifications of the process, apparatus and product that are possible with the invention. The system of FIG. 4 has three meltblown extrusions banks 110, 112 and 114. Each of the banks as illustrated is provided with one feeder for inserting particulate material in accordance with the invention. These feeders 116, 118, and 120 in the versatile system of FIG. 4 may form a one-, two- or three-layer product, utilizing anywhere from one to three of the banks 110, 112 and 114. Further, the banks may be set to each run the same or to provide different additives through the feeders 116, 118, and 120. It is noted that in each case the fiberizers 122, 124, and 126 are provided to feed divellicated cellulosic fibers into the meltblown stream 128, 130 and 132, respectively. For instance, it is possible that the extruder 110 would extrude meltblown polypropylene to which divellicated wood fibers would be added at 134. Feeder 116 would provide superabsorbents 136 to lay down a single layer of meltblown containing superabsorbent 140. The single-layer substrate 140 would then pass beneath meltblown extruder 112 where seeds 142 would be blown into the melt-blown stream 130 immediately prior to blowing the cellulosic fiber 144 into the meltblown stream 130. The meltblown stream 130 would lay down a layer of seed containing melt-blown 146 on top of the superabsorbent containing meltblown 140. The two-layer composite of 140 and 146 then would move below the meltblown stream applicator 114 where another meltblown stream of polypropylene 132 would have added thereto particulate fertilizer material 148 immediately prior to the addition of the divellicated wood fiber 150. The meltblown stream 132 would be laid down onto the previous layer 146 as layer 152. This three-layer composite would contain superabsorbent to maintain moisture, seeds, and fertilizer for the seeds as they grow. The composite 156 formed of layers 140, 146, and 152 then may be rolled or cut to useful forms after leaving the forming apparatus. Rather than having the ingredients of seeds, fertilizer, and superabsorbent inserted where shown, it would be possible to put them in any order. Further, it may be desirable in some instances to mix the seeds, superabsorbent and fertilizer such that they are in each layer. It is also possible that meltblown applicator 110 would be run, making only coform or meltblown polymer without addition of other particulate material. This might be advantageous if particle size is small and the particles could be easily withdrawn by vacuum fan apparatus 160. The particles would be less likely to be withdrawn by later fans 162 and 164 as the particles would be trapped in the first-formed layer 140.

Figure 5:
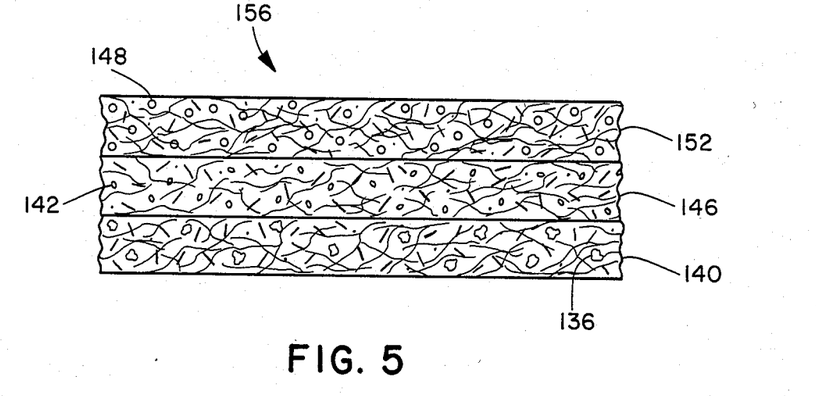
FIGS. 5, 6, and 7 are fragmentary cross sections of multilayered articles in accordance with the invention.

FIG. 5 is a cross section of a sheet 156 of the invention composed of the layers 140, 146, and 152. Particles 136 are of superabsorbent in the bottom-most layer. Particles 142 are seeds in the middle layer 146 while particles 148 are fertilizer in the uppermost layer 152.

Figure 4:
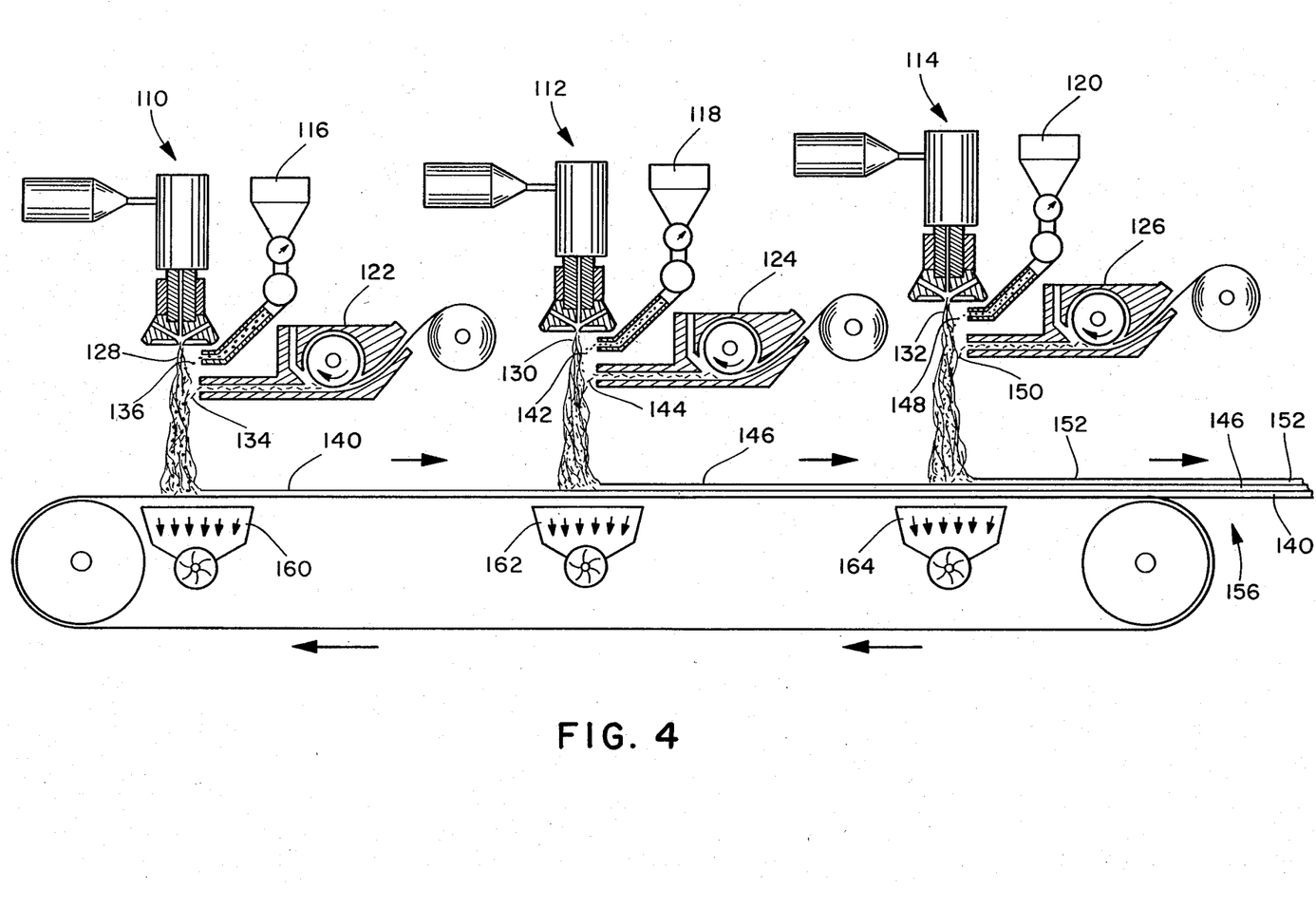
FIG. 4 is a schematic illustration of forming apparatus for forming a multilayered article in accordance with the invention.
Figure 6:
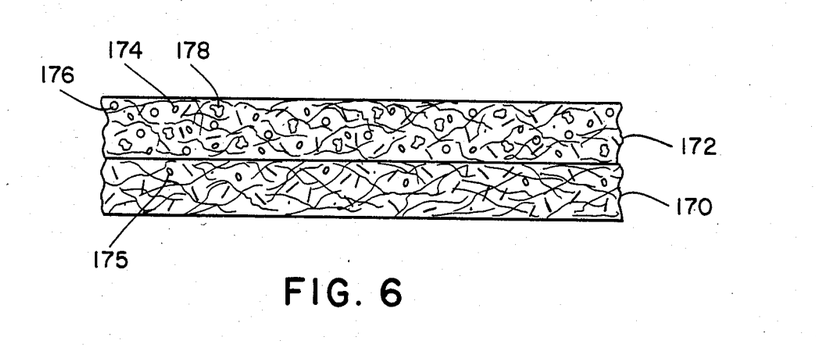

The structure of FIG. 6 is an alternative two-layer structure formed in accordance with the invention. The two-layer structure of FIG. 6 was formed with an initial layer 170 that is a composite of divellicated wood fibers and meltblown material. The upper layer 172 has added thereto seeds 174 and fertilizer 176 as well as superabsorbent 178. It is noted that some particles such as seed 175 have migrated to the lower level by withdrawal of air through the structure during forming. The structure of FIG. 6 could be formed either in a two-bank forming system or in the system such as FIG. 4 with one bank not operating.

Figure 7:
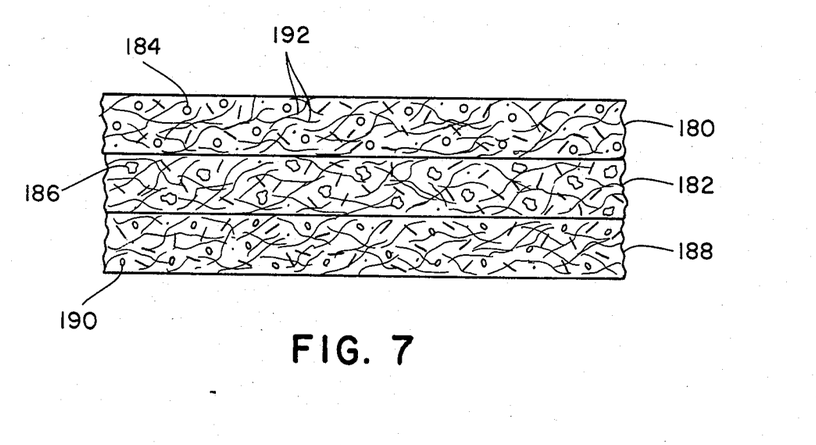

FIG. 7 is another alternate structure. In the structure of FIG. 7 the upper layer 180 is provided with fertilizer 184. The middle layer 182 is provided with superabsorbent 186 while the layer 188 to be placed next to the ground contains the grass seeds 190. This structure is considered desirable as the seeds are continually kept moist by the above superabsorbent. The fertilizer in a dissolvable form is provided to the seeds as they grow. In another variation of this form the polymer fibers 192 of the upper layer may be extruded as a green polymer or the pulp could be dyed green prior to application to provide a more pleasing artificial bed prior to sprouting. Other variations of the invention are possible with varying the number of extrusion banks, number of particle injection nozzles, and variety of additives.

Figure 8:
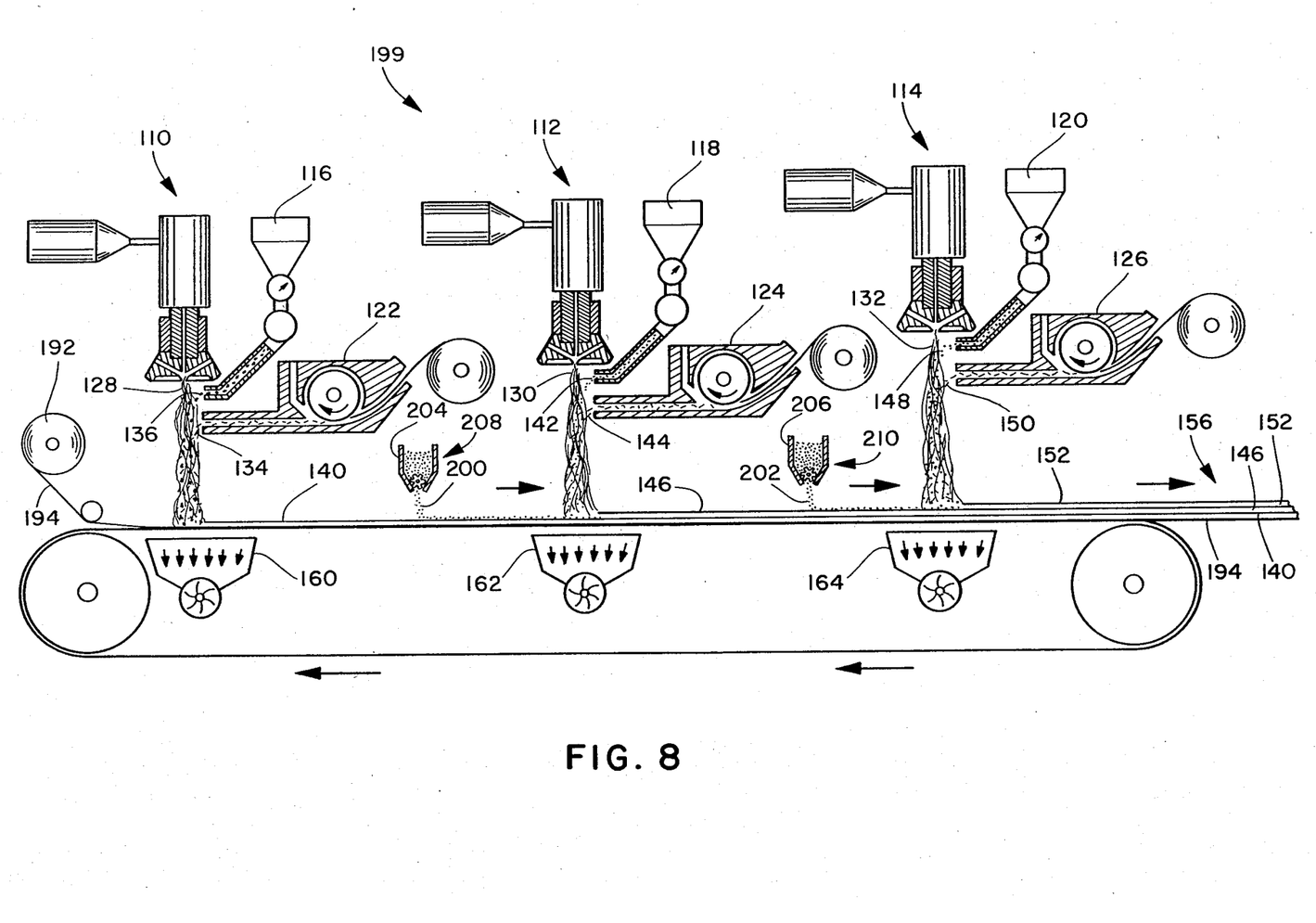
FIG. 8 is a schematic illustration of alternate forming apparatus in accordance with the invention.

Another alternative for forming in accordance with the invention is the apparatus 199 of FIG. 8. The apparatus of FIG. 8 corresponds to that of FIG. 4 except that two particle feeders 208 and 210 are present. Further, a source 192 of permeable substrate material 194 is provided. The feeders 208 and 210 are adapted to feed particles 200 and 202 onto the top of layers 140 and 146 from particle storage devices 204 and 206. This system is particularly well suited for depositing seeds that are too fragile to be injected into the meltblown stream. These particle dispensers for temperature-sensitive materials also could be utilized for dispensing heat-sensitive materials such as fungi spores, yeast, larvae, beneficial insect eggs or bacteria for nonchemical organic pest control in the seedbed. The particle dispensers further are suitable for intermittent dispensing of colorants or other markers to indicate a change in the character of the dispensed material. This apparatus of FIG. 8 allows formation with a large variety of additives both in each of the three meltblown layers and between the meltblown layers. The permeable substrate 194 may be used to provide handling ease and to minimize loss of additive during formation. The permeable material preferred is a substrate of spunbonded polypropylene fiber. The apparatus 199 may be operated with some dispensers of additives not being used or without addition of the substrate 194.

Figure 9:
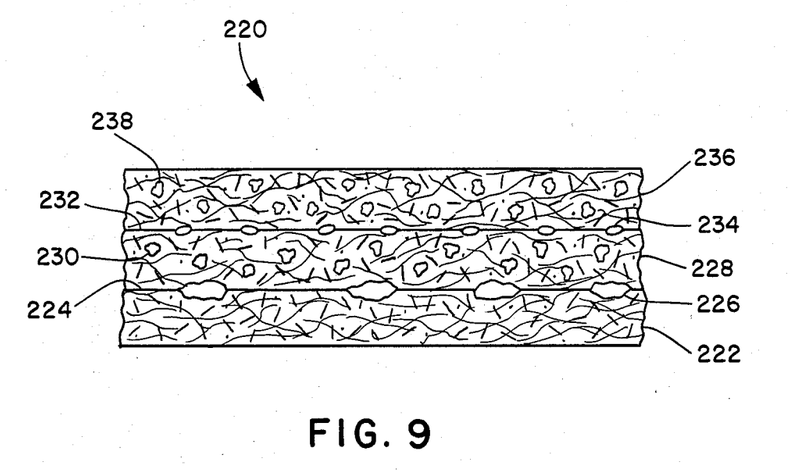
FIGS. 9 and 10 are fragmentary cross sections of multilayered articles in accordance with the invention that may be formed on the apparatus of FIG. 8.
Figure 10:
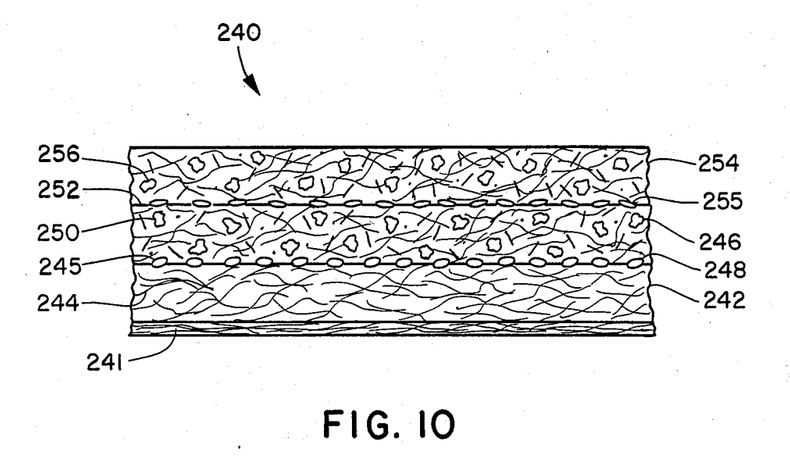

FIGS. 9 and 10 illustrate, in cross section, articles formed in accordance with the invention. These articles are similar to the articles of FIGS. 5 and 7 but have particulate material added by particle applicators 208 and 210 between the layers. In FIG. 9 the layered structure 220 has a base layer of coform 222 with no additives. There have been applied to the top surface 224 of layer 222 large particles 226 of a slowly dissolving fertilizer. The middle layer 228 is coform with superabsorbent 230 added. Above layer 228 on surface 232 seeds 234 have been placed. The top layer 236 is a coform having superabsorbent 238 added thereto.

FIG. 10 illustrates another three-layered structrue 24 formed on a permeable polypropylene spunbonded material 241 such as used for diaper liners. The bottom layer 242 is a meltblown polypropylene fiber 244. At the interface 245 of layer 242 and layer 246 are placed from feeder 208 seeds 248 of a slow-growing grass. The layer 246 comprises coform of meltblown polypropylene and wood fibers to which has been added a hydrogel superabsorbent 250. At interface 252 between middle layer 246 and top layer 254 are placed by hopper 210 seeds 255 of a fast-growing grass such as annual rye grass. These seeds are then covered by layer 254 that is composed of coform as in layer 246 plus particles of superabsorbent 256. The composite 240 is particularly desirable as the fast-growing rye grass will provide ground cover while the slower-growing grass, such as bluegrass, establishes itself. The apparatus of FIG. 8 can be operated in ways to provide a large variety of structures with differing additives in the layers and between the layers as well as various types of web as the substrate layer.

The polymer material forming the meltblown material of the invention may be any suitable polymer. Preferred are polyethylene and polyproylene as they may be made in degradable form. The degradation of polyethylene and polypropylene may be controlled, in a known manner, by the addition and subtraction of ultraviolet inhibitors. Further, it is known as disclosed in U.S. Pat. No. 3,795,654 to form polyolefins having a water-soluble stabilizer that will be leached from the polyolefin by water so that linear polyolefins not exposed to sunlight may be degraded by water. Other polymers may be utilized in the invention such as polyesters and nylons where very slow degradation or no degradation of the polymer is acceptable. The use of a deterioration-resistant polymer might be beneficial in some uses on slopes where runoff is a problem.

Any suitable additive may be provided with the nonwoven meltblown polymer and grass seed composite of the invention. Such additives are color, pesticides such as diazinone, herbicides, fungicides such as copper naphthenate, and rodenticides. Further odor repellents to keep animals such as dogs or cats off new-grown plants could be added. Preferred additives are superabsorbents particularly hydrogels as they provide a moist seedbed for the seeds and fertilizers to provide nutrients.

The seeds added to the substrate may be any desirable type. Typical of seeds suitable for use in ground covers are sedum, clover, ivy, crown vetch, and flowers such as phlox. The preferred material is grass seed as it is widely grown, low in seed size, and may be handled with normal particle delivery systems.

The sheet products of the invention may be further processed after collection by compacting through heat and pressure to control the sheet thickness. Further, the sheet may be embossed to increase its strength and abrasion-resistance.

The blown fibers are preferably microfibers, averaging less than about 10 micrometers in diameter, since such fibers offer more points of contact with the particles per unit volume of fiber. Very small fibers averaging less than 5 or even 1 micrometer in diameter may be used, especially with seeds or hydrogel particles of very small size.

The superabsorbent or hydrogen particles preferrably are those which rapidly absorb and retain under pressure large quantities of liquids. A preferred group of particles comprise modified starches, samples of which are described in U.S. Pat. No. 3,981,100, and high molecular weight acrylic polymers containing hydrophilic groups. A wide variety of water-soluble superabsorbent particles are readily commercially available and will absorb more than 20 times their weight in water and preferably more than 100 times their weight in water. The absorbent particles may vary in size, but generally are preferred to be between about 90 microns and about 425 microns for good retention in the seedbed and ease of handling during formation without creation of dust in the atmosphere.

The particles of seeds, superabsorbents, and other materials may be introduced into the meltblown stream of microfibers at any convenient point. The seeds may be introduced at a point after the meltblown fibers have somewhat solidified such that high temperatures do not damage the seeds. However, even if the streams are somewhat molten, the very high rate of cooling during meltblowing will prevent substantial damage to the seeds as cooling will take place before heat can transfer to and damage the seeds which are ordinarily protected by dry insulating husks. The seeds and other particles are sufficiently trapped by mechanical forces that polymer bonding is not ordinarily necessary to hold the particles in place. Further, as illustrated in FIG. 8, additives too fragile to be blown into the air stream may be deposited between layers.

The artificial bedding of the invention may be combined with other products if desirable. It could be formed as a composite with a spunbound. In fact, this would be desirable as spunbond is sometimes used as a carrier sheet in meltblown forming processes. Further, it is possible that it would be formed on a tissue base or other permeable member. Formation on a tissue or spunbond base would decrease the likelihood of superabsorbent or grass seeds being withdrawn through the forming air system below the foraminous belt.

The artificial bed of the invention may be utilized in a variety of ways. Typically, the composite sheets would be fastened to the ground and watered until the grass or other seed material sprouted and was rooted. The meltblown material and cellulose fibers would then degrade and disperse. Further, it would be possible that entire rolls of the artificial seedbed could be wet and held at proper temperature until germination had started. Then the substrates could be unrolled and applied to the ground to provide even faster ground cover. Such a process might be of advantage in seeding of areas such as ball diamonds or children's play areas where fast rooting is particularly desirable.

Further, the substrates could be used in decorative manners such as covering forms and sprouting the grass to create a living sculpture.

While the invention has generally been described with the addition of divellicated wood fibers from pulp into the meltblown material, it is possible that other sources of cellulose fibers could be utilized. Typical of other sources are peanut seeds, peat moss, and newsprint. These and other cellulose materials would be suitable for the invention as their purpose is to provide absorbent structure as well as some strength to the substrate.

As is apparent from the above description, there are a number of variations of the apparatus, process, and articles of the invention that are possible within the spirit of the invention. The scope of the invention is only intended to be limited by the scope of the claims attached hereto.

We claim:

1. An article comprising a meltblown linear polyolefin polymer easily degraded by sunlight and a plurality of seeds embedded in the loose fibrous structure of said meltblown polymer with the proviso that said meltblown polymer comprises the fibers less than about 10 micrometers in diameter.

2. The article of claim 1 further comprising cellulose fibers.

3. The article of claim 1 further comprising superabsorbent.

4. The article of claim 1 wherein the article comprises a multiplicity of layers.

5. The article of claim 1 wherein the article has additives in each of a plurality of layers.

6. The article of claim 1 wherein said article further comprises cellulose fibers and superabsorbents.

7. The article of claim 1 wherein said article has a backing of spunbonded polymer material.

8. The article of claim 1 wherein said meltblown polymer is easily degraded by water action.

9. The article of claim 1 further comprising at least one member selected from the group consisting of fertilizer superabsorbents, colorants, herbicides, fungicides, rodenticides, odor repellents for animals, bacteria and spores.

10. A process for growing seeds comprising providing a seed bed comprising meltblown linear polyolefin polymer and a plurality of seeds embedded in the loose fibrous structure of said meltblown polymer, placing said seed bed on a suitable substrate and applying moisture to said seed bed with the proviso that said polymer is easily degraded by sunlight and said meltblown polymer comprises fibers of less than about 10 micrometers.

11. The process of claim 10 wherein said seedbed further comprises superabsorbent.

12. The process of claim 10 wherein said seedbed further comprises at least one material selected from the group consisting of superabsorbents, colorants, herbicides, spores fungicides, rodenticides, odor repellents for animals, and bacteria.

13. The process of claim 10 wherein said polymer is ultraviolet degradable polypropylene.

14. The process of claim 10 wherein said seedbed further comprises divellicated wood fibers.

* * * * *